United States Patent
Schmidt

(10) Patent No.: US 8,825,302 B2
(45) Date of Patent: Sep. 2, 2014

(54) MOTOR VEHICLE, IN PARTICULAR AUTOMOBILE, AND METHOD FOR CONTROLLING A MOTOR VEHICLE, IN PARTICULAR AN AUTOMOBILE

(75) Inventor: Christoph Schmidt, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 13/597,424

(22) Filed: Aug. 29, 2012

(65) Prior Publication Data

US 2013/0079991 A1    Mar. 28, 2013

(30) Foreign Application Priority Data

Aug. 30, 2011 (DE) .......................... 10 2011 111 897

(51) Int. Cl.
*B62D 6/00* (2006.01)
*B62D 15/02* (2006.01)

(52) U.S. Cl.
CPC ................ *B62D 6/00* (2013.01); *B62D 15/025* (2013.01)
USPC .......................................................... 701/42

(58) Field of Classification Search
CPC ........................................................ B62D 6/00
USPC .......................................................... 701/42
See application file for complete search history.

(56) References Cited

U.S. PATENT DOCUMENTS

| | | | |
|---|---|---|---|
| 5,765,116 A * | 6/1998 | Wilson-Jones et al. | 701/41 |
| 5,925,082 A | 7/1999 | Shimizu et al. | |
| 6,212,452 B1 | 4/2001 | Shimizu et al. | |
| 6,873,911 B2 * | 3/2005 | Nishira et al. | 701/301 |
| 7,743,866 B2 | 6/2010 | Proemm | |
| 2003/0046021 A1 * | 3/2003 | Lasky et al. | 702/150 |
| 2006/0025896 A1 | 2/2006 | Traechtler et al. | |
| 2007/0233343 A1 | 10/2007 | Saito et al. | |
| 2007/0276577 A1 | 11/2007 | Kuge et al. | |
| 2009/0299573 A1 * | 12/2009 | Thrun et al. | 701/41 |
| 2010/0152952 A1 | 6/2010 | Lee et al. | |
| 2011/0098890 A1 | 4/2011 | Lee et al. | |
| 2011/0241850 A1 | 10/2011 | Bosch et al. | |

FOREIGN PATENT DOCUMENTS

| | | |
|---|---|---|
| DE | 19604220 A1 | 8/1997 |
| DE | 19712857 A1 | 10/1998 |
| DE | 10144797 A1 | 3/2003 |
| DE | 102007039332 A1 | 2/2008 |
| DE | 102007020936 A1 | 12/2008 |
| DE | 102009010006 A1 | 10/2009 |
| DE | 102009019663 A1 | 11/2010 |
| EP | 1867516 A2 | 12/2007 |
| GB | 2481885 A | 1/2012 |

* cited by examiner

*Primary Examiner* — Thomas Tarcza
*Assistant Examiner* — Alex C Dunn
(74) *Attorney, Agent, or Firm* — Ingrassia Fisher & Lorenz, P.C.

(57) ABSTRACT

A motor vehicle and a method for controlling a motor vehicle in road traffic are provided. A motor vehicle includes a driver assistance system and a navigation means comprising a sensor for detecting compressive forces, or tensile forces, or torsional forces. An evaluation unit is coupled to the navigation means and evaluates the signals of the sensor. The evaluation unit puts the driver assistance system into operation or takes it out of operation when a threshold value of the signals stored in the evaluation unit is exceeded or fallen below. A controller is activated when the threshold value is exceeded or fallen below and transfers at least partial control of the motor vehicle by the driver assistance system to manual operation by a driver or transfers the manual control of the motor vehicle to at least partial control by the driver assistance system.

14 Claims, 1 Drawing Sheet

_US 8,825,302 B2_

MOTOR VEHICLE, IN PARTICULAR AUTOMOBILE, AND METHOD FOR CONTROLLING A MOTOR VEHICLE, IN PARTICULAR AN AUTOMOBILE

CROSS-REFERENCE TO RELATED APPLICATION

This application claims priority to German Patent Application No. 10 2011 111 897.0, filed Aug. 30, 2011, which is incorporated herein by reference in its entirety.

TECHNICAL FIELD

The technical field generally relates to a motor vehicle, in particular an automobile, having a driver assistance system and having a navigation means that is provided with a sensor for detecting compressive forces, or tensile forces, or torsional forces. The sensor is connected with an evaluation unit for evaluating the signals thereof. The evaluation unit puts the driver assistance system into operation or takes it out of operation when a threshold value of the signals stored in the evaluation unit is exceeded or fallen below.

The technical field further generally relates to a method for controlling a motor vehicle, in particular an automobile, as a function of a force exerted on a sensor of a navigation means such as a compressive force, or a tensile force or a torsional force or the like. The sensor signal is evaluated by an evaluation unit wherein the driver assistance system is put into operation or taken out of operation when a threshold value is exceeded or fallen below.

BACKGROUND

Known from DE 10 2007 020 936 A1 is a motor vehicle, whose steering wheel serving as a navigation means is fitted with sensors for detecting a tensile or compressive force on the steering wheel. As a result of the tensile or compressive forces exerted on the steering wheel, a driver assistance system is activated or deactivated when a threshold value is exceeded.

It is at least one object herein to provide a motor vehicle or a method for controlling a motor vehicle in which the guidance of the motor vehicle is made substantially more comfortable through simple measures. In addition, other objects, desirable features and characteristics will become apparent from the subsequent summary and detailed description, and the appended claims, taken in conjunction with the accompanying drawings and this background.

SUMMARY

A motor vehicle, in particular an automobile, having a driver assistance system and having a navigation means is provided in accordance with an exemplary embodiment. The navigation means is provided with one or more sensors for detecting compressive forces, or tensile forces, or torsional forces. Signals from the sensor are transmitted to an evaluation unit for evaluation. The navigation means is connected with the evaluation unit for evaluating the signals thereof, which puts the driver assistance system into operation or takes it out of operation when a threshold value of the signals stored preferably in the evaluation unit is exceeded or fallen below. A controller is provided that is activated when the threshold value is exceeded or fallen below and that transfers the function of the motor vehicle taken over by the driver assistance system to manual operation or transfers it into manual operation.

In another embodiment, a method for controlling a motor vehicle, in particular an automobile, as a function of a force exerted on a sensor of a navigation means such as a compressive force, or a tensile force or a torsional force or the like, is provided. The sensor signal is evaluated by an evaluation unit wherein a driver assistance system is put into operation or taken out of operation when a threshold value is exceeded or fallen below. A controller is activated when the threshold value is exceeded or fallen below, and the function of the motor vehicle taken over by the driver assistance system is transferred by the controller to a manual operation or the manual operation by the controller is transferred into the at least one function of the driver assistance system.

In this regard, a driver of a motor vehicle, in particular of an automobile, is provided with the possibility of taking over and influencing the control of the motor vehicle in road traffic exclusively on the driver's side by means of a force exerted appropriately on the navigation means, such as a steering wheel, a control stick, or a joystick or the like. In this operating mode, the driver assistance system or the driver assistance systems are not in operation. A control of the motor vehicle in road traffic exclusively on the driver's side is particularly advantageous for example if the driver wishes to suddenly change his previously planned route, which he has input into his navigation system of the motor vehicle, for example, for some reason. The driver assistance system or the driver assistance systems, which he has activated before or during travel of the motor vehicle, are then at least partially if not completely deactivated through the increase in a compressive or tensile or torsional force above a threshold value, for example, originating from a steering movement of the steering wheel of the motor vehicle. The control of the motor vehicle is thereby transferred into manual operation by the driver. In this mode of operation, the motor vehicle can be controlled by the driver like a conventional motor vehicle.

In an exemplary embodiment, if the compressive or tensile or torsional force, for example, exerted on the steering wheel or on a control stick of the motor vehicle again falls below a specific threshold value, the driver assistance system or the driver assistance systems which had been activated by the driver of the motor vehicle before departure or during its travel are reactivated. The manual control of the motor vehicle therefore again goes over into a control which is at least assisted by the driver assistance system or the driver assistance systems.

A transition from manual control of the motor vehicle in road traffic into control assisted by the driver assistance system and conversely is continuously taken over by a controller so that the transition from manual control of the motor vehicle to the driver assistance system control and conversely is transferred at least largely seamlessly.

The driver assistance system can comprise assistance systems such as a lane change assistance system, a system for automatic distance regulation, a lane holding system, a vehicle stabilization system, and a speed regulating system in road traffic. Of these assistance systems a single system or an arbitrary combination of such single systems in a motor vehicle can be used.

An advantage is obtained if an at least partially autonomous control of the motor vehicle is provided, which cooperates with at least one driver assistance system, preferably with a plurality of driver assistance systems. Through a tensile or compressive or torsional force lying above a specific response value being exerted on the navigation means, which is preferably configured as a steering wheel, for example, the partially autonomous control of the motor vehicle in road traffic is switched by the use of a controller according to an embodiment to an exclusively driver-side control of the motor vehicle or the driver-side control of the motor vehicle is transferred to the at least partially autonomous control of the motor vehicle by the controller.

All assistance systems such as a lane change assistance system, a system for automatic distance regulation, a lane holding system, a vehicle stabilization system, and a speed regulating system in road traffic are used in a partially autonomous control of the motor vehicle.

In one of the preferred embodiments, the controller is configured as an integrally acting controller.

By using an integrally acting controller, a control deviation is reduced at least to a negligible extent. This in particular has the advantage for the transfer from driver assistance control to manual control of the motor vehicle or for the transfer of the partially autonomous control to manual driver-side control that the driver need not compensate for any difference between two control systems of the motor vehicle.

A particularly seamless transition from the manual driver-side control of the motor vehicle into the at least assisting control of the motor vehicle by the at least one driver assistance system or into the partially autonomous control of the motor vehicle and conversely is ensured if the controller is configured as a PID controller or as a PI controller.

The controller functions of the controller are particularly suitable for the continuous changing to and from a manual driver-side control of the motor vehicle to the at least assisting control of the motor vehicle by the driver assistance system or the partially autonomous control of the motor vehicle.

In an exemplary embodiment, the controller, in particular a PID controller, forms a control circuit with a controlled system, which is configured as a first-order delay element or as a second-order non-oscillatory delay member.

Such a control circuit has a sufficiently large phase margin, with the result that a comparatively large stability reserve is obtained for the control circuit and its guidance behavior. The gain crossover frequency of such a control circuit is such that the control circuit can respond comparatively rapidly to changes in the command variable or faults.

It is particularly preferred that when the threshold value is exceeded, the function of the motor vehicle taken over by the driver assistance system or preferably the partially autonomous control of the motor vehicle is transferred to manual operation of the motor vehicle by an operator.

According to a further embodiment, when the threshold value is fallen below, exclusively the driver assistance system takes over at least one function of the motor vehicle. In the event that the driver assistance system is configured as partially autonomous control of the motor vehicle with a plurality of driver assistance systems, the partially autonomous motor vehicle control system takes over the control of the motor vehicle when the threshold value is fallen below.

Such a control of the motor vehicle ensures particular safe guidance of the motor vehicle for older persons or for persons with restricted fitness to drive.

In an embodiment, the navigation means are configured as a steering wheel or as a control stick or as a joystick.

In particular when the steering wheel is fitted with one or more sensors for detecting a compressive or tensile or torsional force, which for example can be disposed between an outer covering layer of the steering wheel made of leather or the like and a foam inner layer, the control of the motor vehicle function by the driver assistance control or the partially autonomous control of the motor vehicle can be transferred in a barrier-free manner into manual control by an operator. This also applies in the converse case when transferring into manual control since in both cases, a change can be controlled by the operator by an action of force to be applied to the steering wheel lying above or below the threshold.

According to another embodiment, a method is provided for controlling a motor vehicle, in particular an automobile, as a function of a force exerted on a sensor of a navigation means such as a compressive force, or a tensile force or a torsional force or the like. A sensor signal is evaluated by an evaluation unit, where at least one driver assistance system is put into operation or taken out of operation when a threshold value is exceeded or fallen below. A controller is activated and the function of the motor vehicle taken over by the driver assistance system is transferred by the function of the controller to a manual operation by the driver of the motor vehicle or the manual operation is transferred by the controller into a function of the driver assistance system.

Such an operating mode of a motor vehicle enables persons unfit to drive or elderly persons to safely drive the motor vehicle in road traffic. This is fundamentally because when the driver does not exert any force on the navigation means, e.g. the steering wheel, the motor vehicle is guided by a driver assistance system or by a plurality of driver assistance systems such as, for example, a lane change assistance system, a system for automatic distance regulation, a lane holding system, a vehicle stabilization system, and a speed regulating system in road traffic. The assistance systems can advantageously be used in various combinations for guiding the motor vehicle without influence by the driver.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
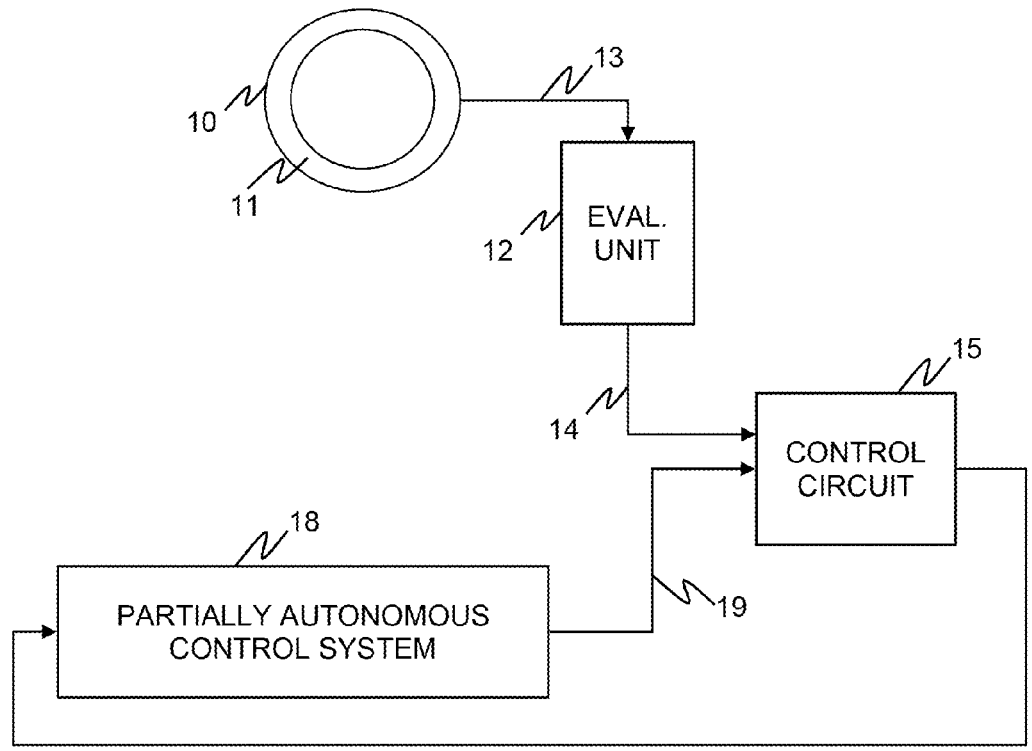
FIG. 1 is a block diagram of the control of an automobile by a driver or by an at least partially autonomous motor vehicle control system in accordance with an exemplary embodiment.
Figure 2:
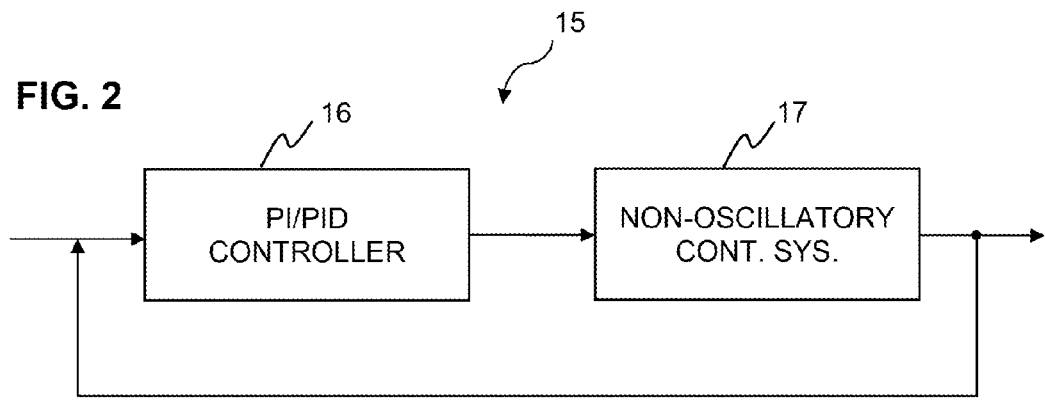
FIG. 2 illustrates a control circuit for changing between a partially autonomous control system and control of the automobile by the driver in accordance with an exemplary embodiment.

In accordance with an exemplary embodiment, FIG. 1 shows a navigation means, for example a steering wheel 10, which has a covering sleeve 11, which for example is formed from a leather or plastic layer, below which a plurality of sensors not shown here, disposed on the circumference of the steering wheel 10. The sensors are embedded between the covering sleeve 11 and a foam layer of the steering wheel 10, likewise not shown. In the present case, the sensors are configured as pressure sensors on which the operator can exert a compressive force with his fingers or with the palm of his hand due to the arrangement thereof in the steering wheel 10.

As a result of at least one compressive force on the steering wheel 10, an electrical signal is generated by the pressure sensor, which signal is fed as input signal 13 to an evaluation unit 12, which for example, can be configured as a comparator or Schmitt trigger. The evaluation unit 12 compares the input signal 13 with a response value serving as a threshold value and, when the response value is exceeded, preferably outputs an output signal 14. The output signal is fed as a command variable to a control circuit 15, which in an embodiment is formed from a PID controller 16 and a non-oscillatory PT2 controlled system 17.

In an embodiment, when the threshold value is exceeded, the control circuit 15 transfers the control of the motor vehicle, which is accomplished by a partially autonomous control system 18 when the threshold value is fallen below, to manual control operation which can be influenced exclusively by the driver. The driver assistance systems in operation during control of the motor vehicle by the partially autonomous control system 18 are put out of operation when the motor vehicle is controlled manually by an operator. However, it is also conceivable that not all the driver assistance systems are put out of operation during manual control of the motor vehicle.

In another embodiment, if the driver of the motor vehicle reduces his compressive force on the steering wheel to an extent that the input signal 13 to the evaluation unit 12 lies below the response value, the output signal 14 thereby produced at the evaluation unit 12 is again fed as command variable to the control circuit 15, whereby the manual control of the motor vehicle by an operator is transferred with the aid of the control circuit to control of the motor vehicle by the partially autonomous control system 18.

With the transfer of the control of the motor vehicle to the partially autonomous control system 18, the switched-off driver assistance systems are at the same time put into operation so that the motor vehicle is guided safely in road traffic without any influence of the driver.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle comprising:
    a driver assistance system;
    a navigation means comprising a sensor for detecting compressive forces, or tensile forces, or torsional forces;
    an evaluation unit coupled to the navigation means, the evaluation unit configured for evaluating signals of the sensor, wherein the evaluation unit puts the driver assistance system into operation or takes it out of operation when a threshold value of the signals stored in the evaluation unit is exceeded or fallen below; and
    a controller that is activated when the threshold value is exceeded or fallen below and which transfers at least partial control of the motor vehicle by the driver assistance system to manual operation by a driver or transfers manual control of the motor vehicle to at least partial control by the driver assistance system.

2. The motor vehicle according to claim 1, wherein the motor vehicle is an automobile.

3. The motor vehicle according to claim 1, wherein the driver assistance system is configured as an at least partially autonomous motor vehicle control system.

4. The motor vehicle according to claim 1, wherein the controller is configured as an integrally acting controller.

5. The motor vehicle according to claim 1, wherein the controller is configured as a PID controller or as a PI controller.

6. The motor vehicle according to claim 1, wherein the controller is disposed in a control circuit together with a controlled system that is configured as a first-order delay element or as a second-order non-oscillatory delay member.

7. The motor vehicle according to claim 1, wherein when the threshold value is exceeded, a function of the motor vehicle taken over by the driver assistance system is transferred to manual operation by an operator.

8. The motor vehicle according to claim 1, wherein when the threshold value is fallen below, exclusively the driver assistance system takes over at least partially control of the motor vehicle.

9. The motor vehicle according to claim 8, wherein when the threshold value is fallen below, exclusively a partially autonomous motor vehicle control system takes over at least partially control of the motor vehicle.

10. The motor vehicle according to claim 1, wherein the navigation means is a steering wheel or a control stick or a joystick.

11. A method for controlling a motor vehicle in road traffic comprises the steps of:
    sensing a force, such as a compressive force, or a tensile force or a torsional force, exerted on a sensor of a navigation means,
    evaluating a signal from the sensor by an evaluation unit,
    putting into operation or taking out of operation a driver assistance system when a threshold value is exceeded or fallen below; and
    activating a controller when the threshold value is exceeded or fallen below;
    wherein control of the motor vehicle taken over at least partially by the driver assistance system is transferred by the controller to a manual control of the motor vehicle by an operator or the manual control of the motor vehicle by the controller is transferred into the at least partial control of the motor vehicle by the driver assistance system.

12. The method according to claim 11, wherein the method is directed to controlling an automobile in road traffic.

13. The method according to claim 11, wherein the transfer of the manual control of the motor vehicle into the at least partial control of the motor vehicle by the driver assistance system or the transfer of the at least partial control of the motor vehicle by the driver assistance system into the manual control is accomplished by an integrally acting controller function of the controller.

14. The method according to claim 13, wherein the integrally acting controller function together with a time-delayed first order controlled system or a time-delaying second-order non-oscillatory controlled system forms a control circuit.

* * * * *